United States Patent
Becherer et al.

(10) Patent No.: US 11,327,710 B2
(45) Date of Patent: *May 10, 2022

(54) AUTOMATIC AUDIO DUCKING WITH REAL TIME FEEDBACK BASED ON FAST INTEGRATION OF SIGNAL LEVELS

(71) Applicant: Adobe Inc., San Jose, CA (US)

(72) Inventors: Nico Becherer, Hamburg (DE); Sven Duwenhorst, Hamburg (DE)

(73) Assignee: Adobe Inc., San Jose, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 16/832,883

(22) Filed: Mar. 27, 2020

(65) Prior Publication Data

US 2020/0225907 A1 Jul. 16, 2020

Related U.S. Application Data

(63) Continuation of application No. 15/804,526, filed on Nov. 6, 2017, now Pat. No. 10,642,571.

(51) Int. Cl.
*G06F 3/16* (2006.01)
*G10L 25/27* (2013.01)
*G10L 25/21* (2013.01)
*G10L 25/48* (2013.01)

(52) U.S. Cl.
CPC .............. *G06F 3/165* (2013.01); *G10L 25/21* (2013.01); *G10L 25/27* (2013.01); *G10L 25/48* (2013.01)

(58) Field of Classification Search
CPC ......... G06F 3/165; G06F 3/048; G10L 25/21; G10L 25/48
See application file for complete search history.

(56) References Cited

U.S. PATENT DOCUMENTS

| 5,521,841 A | 5/1996 | Arman |
| 7,825,322 B1 | 11/2010 | Classen et al. |
| 8,326,444 B1 | 12/2012 | Classen et al. |

(Continued)

OTHER PUBLICATIONS

Let's Edit with Media Composer—Advanced—Audio Ducking In-Depth Jul. 18, 2016 https://www.youtube.com/watch?v=DkKEIrxgRpM (Year: 2016).*

(Continued)

*Primary Examiner* — Cao H Nguyen
(74) *Attorney, Agent, or Firm* — Kilpatrick Townsend & Stockton LLP

(57) ABSTRACT

A computer-implemented method for audio signal processing includes analyzing a foreground audio signal to determine metrics corresponding to audio slices of the foreground audio signal. Each such metric indicates a value for an audio property of a respective audio slice. The method further includes computing a total metric for an audio slice as a function of a set of the metrics corresponding to a set of the audio slices including the audio slice. The method further includes adding a key frame to a track based on the total metric. The track includes the foreground audio signal and a background audio signal, and a location of the key frame corresponds to a location of the audio slice on the track. The key frame indicates a change to the audio property of the background audio signal at the location on the track, and the key frame is utilizable for audio ducking.

20 Claims, 11 Drawing Sheets

(56) References Cited

U.S. PATENT DOCUMENTS

| | | | | |
|---|---|---|---|---|
| 8,428,758 B2* | 4/2013 | Naik | .................... | G10L 21/00 |
| | | | | 700/94 |
| 9,536,541 B2* | 1/2017 | Chen | .................... | G10L 25/45 |
| 2010/0281382 A1 | 11/2010 | Meaney | | |

OTHER PUBLICATIONS

Youtube "Let's Edit With Media Composer—Advanced—Audio Ducking Depth", https://www.youtube.com/watch?v=DkKEIrxgRpM, Jul. 18, 2016, accessed Jun. 17, 2019.

Notice of Allowance from related U.S. Appl. No. 15/804,526, dated Dec. 26, 2019, 6 pages.

* cited by examiner

Generate, for each selected foreground audio clip, audio slices each having a predetermined time length 902

Compute, for each of the audio slices, a root mean square (RMS) level 904

Generate, for each selected foreground audio clip, a summed-area table based on the RMS levels of the audio slices of the selected foreground audio clip 906

Generate, for each selected foreground audio clip, a leap table based on changes to the RMS levels of the audio slices of the selected foreground audio clip 908

Skip, for each selected foreground audio, the computation of an average RMS level for a time period based on entries of the corresponding leap table 910

Compute an average RMS level for a look-ahead window based on entries in the corresponding summed-area table 912

Determine that a key frame should be added based on a comparison of the average RMS level to a threshold or based on a distance to one or more selected background audio signals 914

Generate a decision whether to add the key frame based on ducking state 916

Generate, if the decision is to add, the key frame based on audio ducking parameters 918

*FIG. 9*

AUTOMATIC AUDIO DUCKING WITH REAL TIME FEEDBACK BASED ON FAST INTEGRATION OF SIGNAL LEVELS

CROSS-REFERENCE TO RELATED APPLICATIONS

This application is a continuation application of application Ser. No. 15/804,526, filed Nov. 6, 2017, now allowed, which is incorporated herein by reference in its entirety.

TECHNICAL FIELD

The application generally relates to signal processing, such as to control a set of audio signals based on audio properties of another set of audio signals. In an example, the signal processing involved audio ducking. In this example, a multimedia editing application automatically adds key frames based on metrics of audio signals and, upon a re-organization of the audio signals on a track or a change to an audio signal, efficiently updates the key frames without having to re-compute the metrics.

BACKGROUND

Many multimedia editing applications use a background audio signal, such as music or ambiance sounds, behind a foreground audio signal, such as a dialogue track. For the dialogue to be intelligible, the loudness of the background audio signal should be much lower than that of the foreground audio signal. If the foreground signal is interrupted by pauses, such as a pause in the spoken dialogue, the loudness of the background audio signal can be increased to make the overall sound more interesting. This process of changing the loudness of the background audio signal based on the state for the foreground audio signal is referred to in the industry as "audio ducking."

Existing systems perform audio ducking by adding key frames to indicate an increase or decrease in the loudness of the background audio signal. Adding the key frames is performed in one of two techniques: manual or automated. Both techniques are generally complex and may not produce accurate audio ducking.

More specifically, in existing manual key frame techniques, a user manually places key frames on the background audio signal based on the foreground audio signal. This can be done by eyeballing the waveform of the foreground audio signal or by listening to the foreground audio signal and placing the key frames while listening. Unless a trained user performs this process, the resulting audio ducking can be inaccurate. Further, even if a trained user performs the process, the overall workflow is tedious, unscalable, and time consuming.

Existing automated key frame techniques can also be inaccurate, inefficient, or both. In one approach, such existing techniques break the foreground audio signal into multiple audio clips. Key frames are then added at the start and end of each of the audio clips. However, because this approach does not rely on the actual dialogue in each of the foreground audio clips, the audio ducking can be inaccurate. For example, if an audio clip starts with a long pause before an actual dialogue, the existing systems would add a key frame at the start of the audio clip and a long time before the actual dialogue. Hence, the audio ducking would result in a long period of silence before the actual dialogue starts. In another example, the key frame generation is automated by recording a volume change during real-time mixing and a key frame is added at a location of a volume change. Although this approach can be more accurate, it can be computationally inefficient because each time there is a change to the audio mixing, the key frame generation needs to be repeated altogether.

In another approach, the existing automated key frame techniques use side chaining. Generally, side chaining refers to routing the foreground audio signal to a side chain of an audio processor that controls the background audio signal. When the volume of the audio signal in the side chain is high enough, the audio processor reduces the volume of the background audio. However, existing side chaining systems can only perform accurate ducking if a delay is introduced such that the volume of the background music is reduced a little before the increase to the volume in the side chain. Further, configuring such systems can be complex because of the complexity to set-up the routing of the foreground signal to the side chain and to fine tune the audio processor.

SUMMARY

Various embodiments relate to signal processing. In an example of the signal processing, audio ducking can be automatically performed, results in accurate key frames, and is computationally efficient. For instance, a computer system accesses a foreground audio signal and generates metrics corresponding to audio slices of the foreground audio signal and indicating values for an audio property of the foreground audio signal. Each metric corresponds to an audio slice, indicates a value for the audio property in the audio slice, and is generated based on an audio signal of the audio slice. The computer system computes a total metric for an audio slice based on a set of the metrics corresponding to a set of the audio slices. The set of the audio slices includes the audio slice. The computer system adds a key frame to a track based on the total metric. The track organizes a presentation of the foreground audio signal and of a background audio signal. A location of the key frame corresponds to a location of the audio slice on the track. The key frame indicates a change to the audio property of the background audio signal at the location on the track. These illustrative examples are mentioned not to limit or define the disclosure, but to provide examples to aid understanding thereof. Additional embodiments and examples are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

FIG. 9 illustrates an example of a flow for processing audio signals based on audio ducking parameters, according to certain embodiments of the present disclosure.

DETAILED DESCRIPTION

Figure 1:
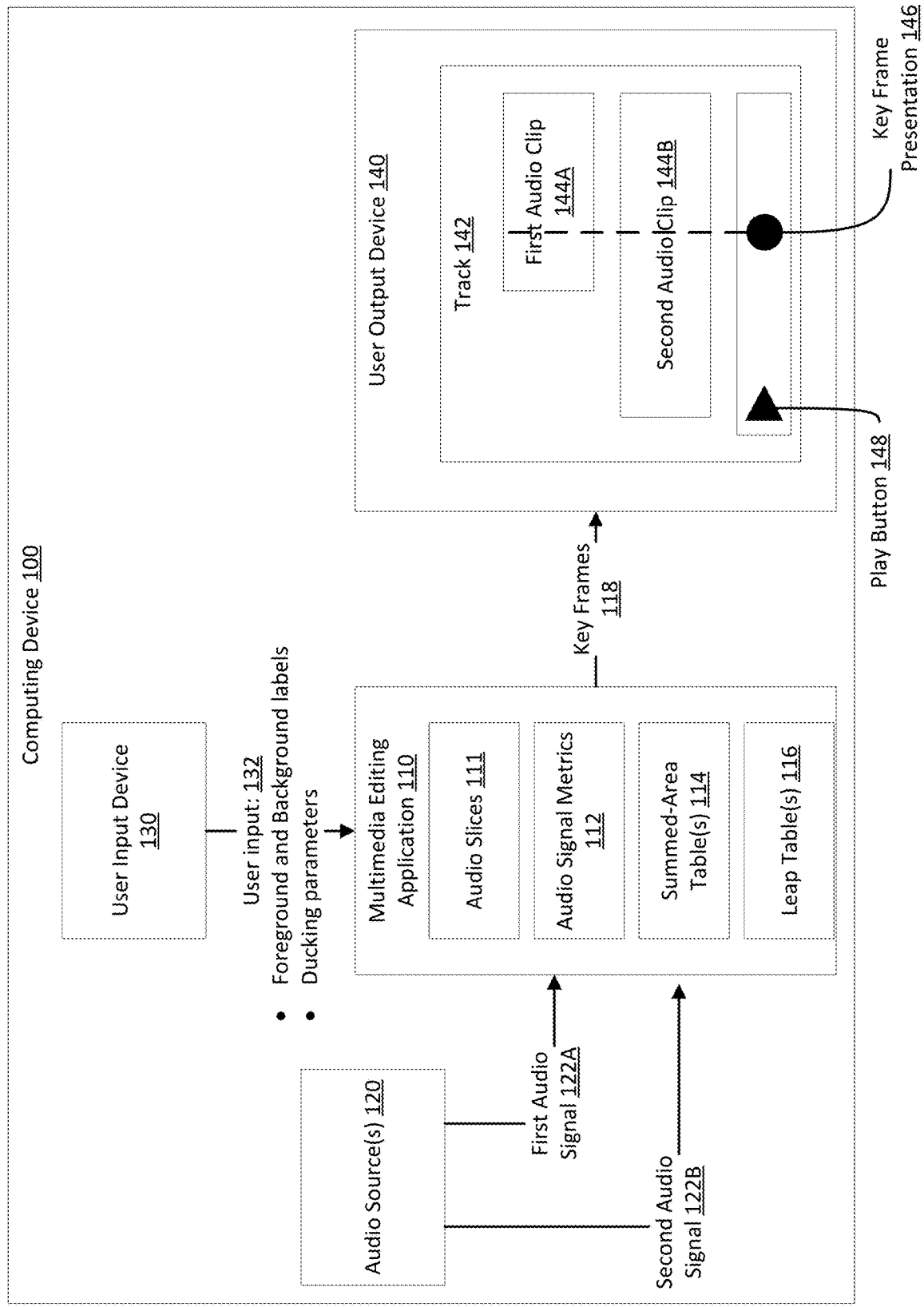
FIG. 1 illustrates an example of a computing device configured to perform audio ducking, according to certain embodiments of the present disclosure.

Embodiments of the present disclosure are directed to, among other things, signal processing. In an example, audio signal is processed and the processing includes audio ducking that is fast, automated, accurate, and computationally efficient. For instance, a foreground audio signal is analyzed. The analysis includes generating metrics (e.g., root mean square (RMS) levels) for audio slices of the foreground audio signal, where each audio slice has a relatively short time length (e.g., ten milliseconds). Each of the metrics indicates a value for an audio property of the foreground audio signal. A data structure, such as a summed-area table, is also generated based on the metrics. Entries of the data structure allow a computation of a total metric (e.g., an average RMS level) in a more efficient manner than computing the total metric directly from the metrics of the audio slices. The analysis also includes using an observation window that includes multiple audio slices. The observation window has a longer time length (e.g., fifty milliseconds) than each audio slice (e.g., ten milliseconds) and is shorter than the foreground audio signal (e.g., in the seconds range). The total metric is efficiently computed for the observation window from the entries of the data structure. Depending on the total metric, a key frame is automatically added at a time point within the observation window to duck a background audio signal against the foreground audio signal.

In an illustrative example, a multimedia editing application presents a first audio signal and a second audio signal as two respective audio clips at a user interface. The multimedia editing application receives user input labeling the first audio clip as foreground and the second audio clip as background. The multimedia editing application also receives user input requesting to duck the background audio clip against the foreground audio clip and specifying audio ducking parameters such as a gain (e.g., the volume change to the background audio clip). Accordingly, the multimedia editing application accesses the foreground audio clip, computes the RMS level for every ten milliseconds audio slice (or some other length audio slice) from the actual audio signal in the audio slice, and generates a summed-area table based on the RMS levels. Thereafter, a fifty milliseconds observation window is used to compute an average RMS level across five audio slices. The average RMS level is computed from the summed-area table instead of the five individual RMS levels of the five audio slices. The structure of this table allows the computation of the average RMS level from two entries only: an entry corresponding to the first audio slice and an entry corresponding to the last audio slice from the observation window. If the average RMS level exceeds a threshold, the multimedia editing application adds a key frame at the end of the first audio slice in the observation window (e.g., at ten milliseconds after the start of the observation window).

Furthermore, the multimedia editing application can efficiently update the added key frames based on changes to the foreground audio clip. In an example, additional user input is received and changes the gain (e.g., the volume level) of the foreground audio clip. Instead of recomputing the individual RMS level for each audio slice, the entries of the summed-area table are scaled according to this gain. The updated entries are then used to compute an average RMS level per look-head window, thereby enabling the update to the key frames. In another example, the multimedia editing application receives additional user input that moves the foreground audio clip to a new time location. In that case, the summed-area table need not be updated. Instead of recomputing the individual RMS level for each audio slice, the current entries of the summed-area table are re-used to compute an average RMS level per look-head window, thereby enabling the update to the key frames.

Embodiments of the present disclosure provide many technical advantages over existing manual and automated systems for audio ducking. For example, the embodiments allow automatic, yet accurate, audio ducking because the key frames are generated according to the actual audio signals within the audio clips (in contrast to the start and end of each audio clip, as in some existing systems). Hence, if a foreground audio clip includes a long silence before dialogue, a key frame can be more accurately added to the start of the dialogue (in contrast to the start of the audio clip, as in some existing systems). In turn, the accuracy associated with adding key frames improves the overall quality of the audio ducking. For example, allows controls over the key frames in more meaningful ways than what is available in existing systems. For instance, in a documentary multimedia file the overall selected time parameters lead to a softer ducking of the music, softer fades, longer pauses. In a commercial trailer, more aggressive audio ducking is possible because the short audio slices allow a more vivid definition of when to start and end the fading.

In another example of the technical advantages, the audio ducking is computationally efficient because a summed-area table is used (or any functionally similar data structure that allows an efficient computation of arbitrary ranges of metrics). In particular, the table reduces the number of operations to compute a total metric (e.g., an average RMS level) because only two operations are needed for the computation from the table (in comparison, if an average is computed directly from five individual RMS levels, the computation would involve five operations). Further, once the summed-area table is generated, it is re-usable even when there are changes to the foreground audio clip (e.g., gain change, location change). The re-use of the summed-area table avoids the need to re-compute the metrics (e.g., the individual RMS levels of the audio slices), thereby further increasing the computational efficiency. In turn, the computational efficiency of using and re-using the summed-area table provides the technical advantage of performing the audio ducking in a fast, almost real-time manner. For example, within a short time (e.g., less than one second) from receiving user input specifying the ducking parameters, the multimedia editing application generates and adds the key frames. Similarly, within an even shorter time (e.g., in the milliseconds range) from receiving user input specifying a change to the foreground audio clip, the multimedia editing application updates the key frames. As further described in connection with the next figures, the embodiments of the present disclosure also include a user-friendly and intuitive user interface for the multimedia editing application. This interface provides visual feedback for how edits to the foreground audio signal properties impacts the ducking of the background audio signal.

As used herein, an "audio signal" represents audio data that can be audibly presented to a user. In some examples, the audio data can also have a visual representation such as one in the time domain or frequency domain. Examples of audio data include music, dialogue, natural language speech, synthesized speech, sound effects, and noise.

As used herein, an "audio clip" represents a collection of audio data, wherein the collection has a defined duration such as a start and an end. In some examples, an audio clip is available from one or more audio sources, such as an audio file, a microphone, or a line-in to a computing device. The audio clip can be played such that is audio signal is audibly presented to a user. The audio clip can be also visually presented at a graphical user interface.

As used herein, "foreground" and "background" represent a priority, where foreground indicates a higher priority than background. For example, a foreground audio clip can be given a higher priority than a background audio clip such that the audible presentation of the foreground audio clip is more noticeable than that of the background audio clip during an overlap of the two audible presentations. In this way, the foreground audio clip is played in the foreground and the background audio clip is played in the background during the overlap.

As used herein, a "track" represents an organization of multiple audio clips. In some examples, the organization is a timeline that sets the sequence for the audible presentation of the audio clips. For example, the track identifies that a first audio clip should be played between time $t_0$ and $t_2$ and that a second audio clip should be played between time $t_1$ and $t_3$, where $t_0<t_1<t_2<t_3$.

As used herein, a "key frame" represents an object that defines a start, an end, or start and end, for a transition. In some examples, the transition relates to changing an audio property of an audio signal. For instance, the key frame is added to a time location of a track and references a change to a gain, delay, equalization (EQ) settings, or another property of a foreground audio signal, where the change starts or ends at that time location.

As used herein, an "audio slice" represents a portion of an audio clip. In particular, the audio clip contains an audio signal of a certain time length. In comparison, the audio slice contains a portion of the audio signal, where this portion has a relatively shorter time length.

As used herein, an "observation window" represents a set of audio slices that are analyzed. In some examples of audio slices defined in the time domain, the audio slices that form the observation window are sequential in time. Generally, metrics for audio slices that belong to an observation window are analyzed to generate a total metric for the observation window. This total metric can be used for a key frame decision. Hence, observation windows allow the analysis of sets of audio slices.

As used herein, a "multimedia editing application" represents a set of computer-readable instructions stored on a computer-readable medium and executable by a processor of a computing device to provide multimedia-related functionalities. In some examples, the functionalities include presenting, editing, and storing audio signals as audio clips. The multimedia editing application can be a video editing application or an audio editing application. Examples of the multimedia editing application include Adobe Audition, available from Adobe Systems, San Jose, Calif.

In the interest of clarity of explanation, various embodiments of the present disclosure are described in connection with audio ducking. However, the embodiments are not limited and apply to other types of signal processing. Generally, one set of audio signals (e.g., background signals) is controlled based on audio properties of another set of audio signal (e.g., foreground signals). The processing involves monitoring changes to the audio properties and inserting key frames to control the background signals based on the changes. The control includes, for example, inserting an audio and using the key frames to control one or multiple parameters over time. Monitoring the changes relies on processing audio slices of the foreground signals to generate metrics and a window that includes multiple audio slices to measure the changes.

In also the interest of clarity of explanation, various embodiments of the present disclosure are described in connection with changing the level of a background audio signal. A level change alters the loudness or volume of this audio signal. Nonetheless, the embodiments are not limited as such. Instead, the embodiments similarly apply to changing other properties of an audio signal within the context of audio ducking, such as its EQ settings, delay, or any other time-domain or frequency-domain property. Generally, two (or more) audio signals have different dependencies (e.g., priorities such as background and foreground, a scaler-based binding such as one that adjusts with scaler by energy changes in frequency bands, detection and switching such as detecting presence of phoneme and turning off filter, and thresholding or relative comparison of an audio property such as a volume between the audio signals). One audio signal may be ducked against the other audio signal given the dependencies. The former audio signal can be referred to as the "ducked audio signal" and the latter audio signal can be referred as the "ducked against audio signal." The ducking is performed by analyzing how a property of the ducked against audio signal changes in the time domain or frequency domain. The analysis involves deriving metrics that show the change to the property. Metrics for short audio slices are derived first. Based on these metrics, total metrics for observation windows are further derived (e.g., a summed-area table can be used as further explained herein below). These total metrics are used to generate decisions for adding key frames. The key frames control the time, frequency, type, and/or amount of change to the property of the ducked audio signal.

FIG. 1 illustrates an example of a computing device 100 configured to perform audio ducking, according to certain embodiments of the present disclosure. As illustrated, the computing device 100 hosts a multimedia editing application 110 and includes one or more audio source(s) 120, a user input device 130, and a user output device 140. Audio signals 122 are available from the audio source(s) 120 and are processed by the multimedia editing application 110 in light of user input 132 related to audio ducking to generate key frames 118. The user input 132 is available from the user input device 130. The user output device 140 outputs information about the audio ducking by providing a presentation of the audio signals 122 and a presentation of the key frames 118. For example, the user output device 140 includes a user interface that renders the audio signals 122 or edits thereto in real-time, renders the key frame information including location of key frames and changes to audio properties that the key frames reference.

Generally, the computing device 100 includes a processor and a memory that stores computer-readable instructions associated with the multimedia editing application 110. Each of the processor and the memory can be physical hardware (e.g., hardware of a personal computer, a tablet, etc.) or virtual computing resource hosted on physical hardware (e.g., virtual machines hosted in a datacenter). When the computer-readable instructions are executed by the processor, the multimedia editing application 110 becomes operable to a user of the computing device 100. The user interacts with the user input device 130, such as with a touch screen, a keyboard, and/or a mouse, to provide the user input 132 to the multimedia editing application 110. The user input 132 specifies various aspects of the audio ducking. Based on the user input 132 and the audio signals 122, the multimedia editing application 110 generates and/or presents the audio signals 122 and the key frames 118 on the user output device 140, such as one that includes a graphical display and an audio speaker.

In an example, the audio signals 122 are available from a single audio source 120 or from multiple audio sources 120. FIG. 1 illustrates two audio signals: a first audio signal 122A and a second audio signal 122B. However, a different number of audio signals can be available.

The user input 132 sets the priorities (or other dependencies) of the audio signals 122. For instance, the user input 132 labels the first audio signal 122A as foreground and the second audio signal 122B as background. Other labels are also possible. For example, "dialogue" and "music" can be used instead of foreground and background. Likewise, other numbers of labels are possible depending on the number of priorities.

The user input 132 also designates one or more of the audio signals 122 as "ducked audio signals" and one or more other ones of the audio signals as "ducked against audio signals." For instance, the user input 132 sets the first audio signal 122A as the foreground audio signal to be ducked against and sets the second audio signal 122B as the background audio signal to be ducked. In this way, the gain of the second audio signal 122B would be controlled depending on changes to the volume of the first audio signal 122A over time.

In addition, the user input 132 specifies parameters associated with the audio ducking, such as the gain change, fade timing, and other parameters as further described in connection with the next figures. When a key frame 118 is added, the key frame 118 references these parameters. In this way, when the second audio signal 122B is ducked, the change to its volume is controlled by the parameters set by the user.

In an example, the multimedia editing application 110 processes the audio signals 122 according to the user input 132 and outputs the key frames 118. In an example, the multimedia editing application 110 presents the output of the processing on the user output device 140. For instance, the user output device 140 includes a user interface that supports multiple output modalities, such as graphical and audible modalities. The multimedia editing application 110 drives the user interface by presenting thereon a track 142. The track 142 organizes the presentation of the audio signals 122 as audio clips (e.g., shown as first audio clip 144A and second audio clip 144B corresponding to the first audio signal 122A and the second audio signal 122B, respectively). The track 142 also presents objects 146 (e.g., graphical user interface objects) on the user interface that show the locations of the key frames 118 relative to one or more of the audio clips 144. Each object 146 can correspond to a key frame 118 and is presented at a location where audio ducking occurs (e.g., where there is a change to the gain of the background audio signal 122B).

As shown in the next figures, the user input device 130 and the user output device 140 can be the same or can share components. For instance, the same user interface is presented to the user for receiving the user input 132 and for presenting the track 142. In this way, the user can control the audio ducking and observe the result of such controls on the same user interface. In an example, the controls include not only the user input 132, but also movement of the audio clips. For instance, the user can change the location of the first audio clip 144A relative to that of the second audio clip 144B on the track 142. In that case, the multimedia editing application 142 automatically refreshes the user interface to update the objects 146, thereby reflecting any changes made to the key frames 118. In an example, the user selects a play button 148 rendered by the user output device 140. In response, the audio clips 144 are rendered in real-time. In addition, the key frame objects 146 are rendered. Any time the user edits the audio clips 144 and selects the play button 148, the edits are rendered in real-time and the updates to the key frames are also rendered in real-time or in substantially real-time relative (e.g., within milliseconds) to rendering the edits.

In an example, processing the audio signals 122 includes generating audio slices 111, audio signal metrics 112, summed-area table(s) 114, and leap table(s) 116. Generally, an audio slice is a slice (e.g., a portion) of an audio signal 112 having a predefined time length and/or frequency band. For example, the audio slices 111 are defined in the time domain. In this domain, the audio slices 111 are sequential in time, non-overlapping, and each has a predefined time length. This length is in the range of 2 ms to 20 ms. In an example, the predefined time length is 10 ms. Of course other time length values are possible. Generally, the time slice duration directly influences the temporal resolution. The shorter the duration, the better the resolution becomes. Alternatively or additionally, the audio slices 111 are defined in the frequency domain. In this domain, the audio slices 111 are sequential in frequency, non-overlapping, and each has a predefined frequency band range.

The audio signal metrics 112 for an audio signal are generated by analyzing a property (e.g., the level such as the magnitude in the time domain or the power spectrum in the frequency domain) of the audio signal in the time domain and/or frequency domain. Generally, an audio signal metric 112 is generated for an audio slice 111 of an audio signal 122 by analyzing the property of the audio slice 111 and the audio signal 112 reflects a value of that property within the audio slice (e.g., an average value, a peak value, etc.). The type of metric depends on the property under analysis. For example, to analyze how the loudness of an audio signal changes over time, RMS levels can be computed from the actual values of the audio signal in the time domain. In this case, the audio signal metrics 112 are the individual RMS levels. Each individual RMS level indicates the average RMS level within an audio slice 111. Other parameters are also possible for the loudness, such as the short term loudness and peak levels. The generated audio signal metrics 112 need not be stored. Instead, these metrics 122 are used to generate the summed-area table(s) 114 and the leap table(s) 116.

Further, in one implementation that relies on thresholding to add key frames, it may be sufficient to analyze the "ducked against audio signal(s)" (e.g., the first audio signal 122A) without having to analyze the "ducked audio signal(s)" (e.g., the second audio signal 122B). In other words, the audio signal metrics 122 are metrics derived from the property values of the ducked against audio signal(s). In another implementation that relies on distances between ducked and ducked against audio signals, both types of signals are analyzed and the audio signal metrics 122 are generated for both types.

In addition, the multimedia editing application generates and stores, for each analyzed audio signal 122, a summed-area table 114 from the audio signal metrics 112 generated for that audio signal 122. Hence, a summed-area table 114 is generated for the first audio signal 122A ("the ducked against audio signal") and, depending on the threshold or distance implementation, another summed-area table 114 can be generated for the second audio signal 112B ("the ducked audio signal").

Although FIG. 1 illustrates a summed-area table 114, any functionally similar data structure that allows an efficient computation of arbitrary ranges of metrics can be used. Generally, the summed-area table 114 is a data structure and algorithm for quickly and efficiently generating a total metric out of the audio signal metrics 112 (e.g., an average RMS level out of individual RMS levels). In an example, the audio slices 111 are sequential and each of the individual metrics 112 "i" (e.g., an individual RMS level) corresponds to an audio slice "n" in the sequence. The value "I" for an entry "n" of the summed-area table 114 is derived as I=$\Sigma_{n' \le n}$ i(n') (e.g., $\Sigma_{n' \le n}$ individualRMS(n')). Once the summed-area table 114 is generated, the total metric "T" between two audio slices "n" and "n+k" can be efficiently computed based on the I(n) and I(n+k) values without relying on any other entries from the summed-area table 114 (e.g., AverageRMS(n, k)=(I(n+k)−I(n))/k). This computation is much more efficient than having to compute the total metric directly from the audio signal metrics 122 (e.g., computing AverageRMS(n, k)=(I(n+k)−I(n))/k involves two operations (a subtraction and a division, whereas computing AverageRMS(n, k)=$\Sigma_{n \le j \le k}$ individualRMS(j)/k involves "k−n+I" operations (e.g., "k−n" additions and a division).

To further improve performance, the multimedia editing application 110 generates and stores a leap table 116 for each analyzed audio signal 122. Generally, the leap table 116 indicates whether a change to the analyzed property of the audio signal 122 is significant between time points or frequency points. If the change is insignificant, the multimedia editing application 110 can skip the analysis of whether to add a key frame at any or between these points and, instead, maintain the current audio ducking state (e.g., keep the background audio signal 122B ducked against the foreground audio signal 122A if audio ducking is occurring or keeping the background audio signal 122B un-ducked against the foreground audio signal 122A if no audio ducking is occurring). By skipping the analysis, unnecessary computations can be avoided, thereby increasing the computational efficiency of the audio ducking.

In an illustrative example, RMS levels are computed as the audio signal metrics 112 for the first audio signal 122A and entries of the summed-area-table 114 are generated as I=$\Sigma_{n' \le n}$ individualRMS(n'). In this example, the possible RMS levels are quantized in large virtual buckets of a certain level (e.g., 4.5 dB). The leap table 116 is a list that contains an entry for every time the RMS level of an audio slice 111 changes from a current quantization bucket into another quantization bucket. Relative to a current entry, the next entry in the leap table 116 corresponds to the next audio slice where a quantization bucket change occurs again. For audio slices 111 associated with the current entry, the change to the RMS level is insignificant and the analysis of whether to add a key frame at locations corresponding to any of these audio slices 111 can be skipped.

Accordingly, processing the audio signals 122 includes determining which of the audio signals 122 are "ducking against audio signals" based on the user input 132. At least for each of these signals, the processing further includes generating audio slices 111 (e.g., 10 ms non-overlapping and sequential time slices), audio signal metrics 112 (e.g., individual RMS levels corresponding to the audio slices 111), a summed-area table 114 (e.g., one that allows computing the average RMS level between any arbitrary time slices), and a leap 116 (e.g., one that identifies the time slices where there is a significant change to the RMS levels). The multimedia editing application 110 skips the key frame generation analysis between time slices having insignificant changes based on the leap table 116. Otherwise, the multimedia editing application 110 uses an observation window (e.g., one that includes five sequential time slices—starting at time slice "n" and ending at time slice "n+5"). The observation window has a length longer than that of the individual audio slices 111 (e.g., for a time domain-defined observation window, its time lengths is in the range of 30 ms to 200 ms, such as 50 ms containing five time slices, each 10 ms long).

The total metric for the observation window is derived from the summed-area table 114 (e.g., the average RMS level between the "n" the "n+5" audio slices). If the total metric exceeds a threshold, or if the distance between this observation window and that of the "ducked against audio signal" changes by a certain amount (the distance can be the difference between the total metrics of the two observation windows), the multimedia editing application 110 determines that a key frame 118 should be added to the track 142. The key frame 118 is added to a location that falls within the observation window. The location can be in time or in frequency depending on how the observation window is defined (e.g., in the time domain or in the frequency domain). In an example, the time location corresponds to the end of the first audio slice "n" in the observation window (e.g., if this audio slice ends at time "$t_n$" on the track 142, the key frame 118 is located at time "$t_n$"). The key frame 118 references the audio ducking parameters as defined in the user input 132. The multimedia application 110 changes the property (e.g., the gain) of the ducked audio signal at the location of the key frame 118 (e.g., at time "$t_n$" on the track 142) according to these parameters.

From that point on, if changes are made to the gain of the audio signals 122, location in time of the audio signals 122 (e.g., my moving an audio clip on a track), or to parameters of the audio ducking, the multimedia application 110 need not re-compute the audio signal metrics 112. Instead, it is sufficient to update the summed-area table(s) 114 as needed (e.g., by scaling the entries thereof when the user input 132 changes the gain) and re-use the entries of the summed-area table(s) 114 to update the key frames 118.

Hence, a user can operate the computing device 100 to automatically, accurately, efficiently, and quickly perform audio ducking. The overall ducking process may include multiple steps. In a first step, the user labels the audio clips 144, where the labels define the audio priority (e.g., foreground or background) or audio type (e.g., speech, sound effects; each audio type can be associated with a priority). In a second step, the user specifies the ducking parameters, such as by identifying the audio clips that should be ducked against and the audio clips that should be ducked and by defining the change that should be applied to the ducked audio clips. In a third step, the multimedia editing application 110 generates the audio metric signals 112, the summed-area table(s) 114, and the leap table(s) 116. In a fourth step, the multimedia editing application 110 uses the summed-area table(s) 114 and the leap table(s) 116 to efficiently determine whether key frames 118 should be added and the locations of these key frames 118 on a track 142 and, accordingly, adds these key frames 118. In a fifth step, the user moves one or more audio clips on the track and/or changes some of the ducking parameters. Without having to re-generate the audio metric signals 112, the multimedia editing application 110 re-uses the summed-area table(s) 114 and the leap table(s) 116 to update the key frames 118.

Figure 2:
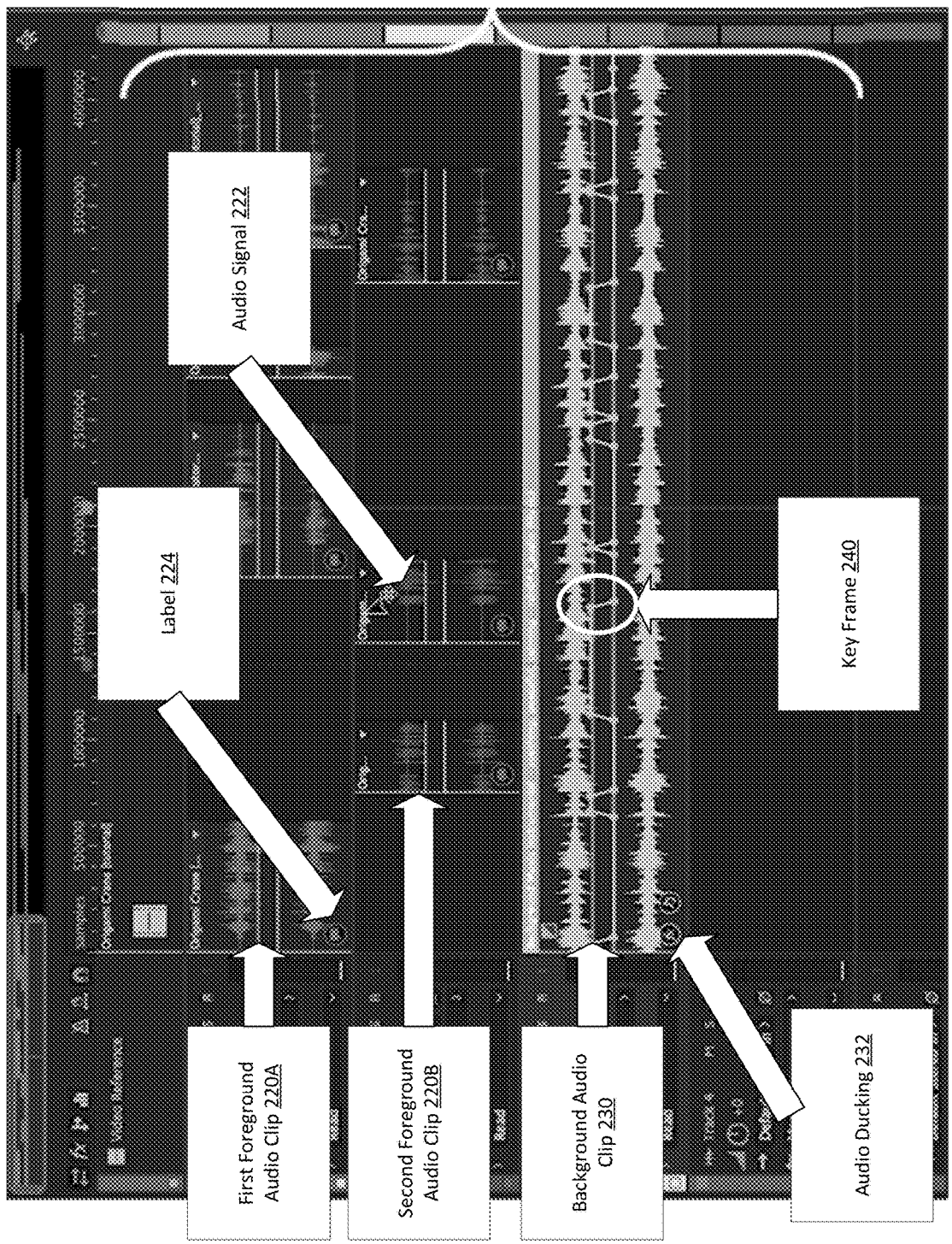
FIG. 2 illustrates an example of a graphical user interface that presents key frames associated with audio ducking, according to certain embodiments of the present disclosure.

FIG. 2 illustrates an example of a graphical user interface that presents key frames associated with audio ducking, according to certain embodiments of the present disclosure. The graphical user interface can be presented by the multimedia editing application 110 on the user output device 140 of FIG. 1. The illustrated graphical user interface is provided for illustrative purposes only. Of course, other layouts and functionalities of graphical user interfaces or types of user interfaces are possible.

As illustrated, the graphical user interface includes a track 210 that organizes the presentation of a plurality of audio clips. Three audio clips are presented for illustrative purposes: a first foreground audio clip 220A, a second foreground audio clip 220B, and a background audio clip 230. The graphical user interface can also include a visual presentation 222 of the audio signal of each of the clips. The visual presentation 222 shows the magnitude of an audio signal over time for illustrative purposes. Each of these audio clips has a label 224. For example, the first and second foreground audios clip 220A and 220B are labeled as "dialogue" (shown with a dialogue icon) and the background audio clip 230 is labeled as "music" (shown with a music icon). Further, an audio ducking icon 232 is presented to indicate that ducked audio clip (e.g., the background audio clip 230).

In addition, the graphic user interface includes graphic user interface objects 240 representing key frames. These key frame objects 240 are shown at specific locations on the track 210 where audio ducking occurs. For instance, the key frame objects 240 are positioned over the presentation of ducked audio clip (e.g., the background audio clip 230) at specific locations of its audio signal where the audio ducking is applied or removed. Applying the audio ducking includes transitioning the background audio clip 230 from an un-ducked state to a ducked state (e.g., from regular volume to a reduced volume). FIG. 2 shows this transition by presenting a key frame as a pair of two points connected by a diagonally ascending line (e.g., the key frame object 240 includes the pair and the line). Removing the ducking includes the converse transition: from the ducked state to the un-ducked state (e.g., from the reduced volume to its regular volume). FIG. 2 shows this transition by presenting a key frame as a pair of two points connected by a diagonally descending line. In the example time domain representation of FIG. 2, the angle of the line (ascent or descent) represents a fade timing: the total time of the transition.

Figure 3:
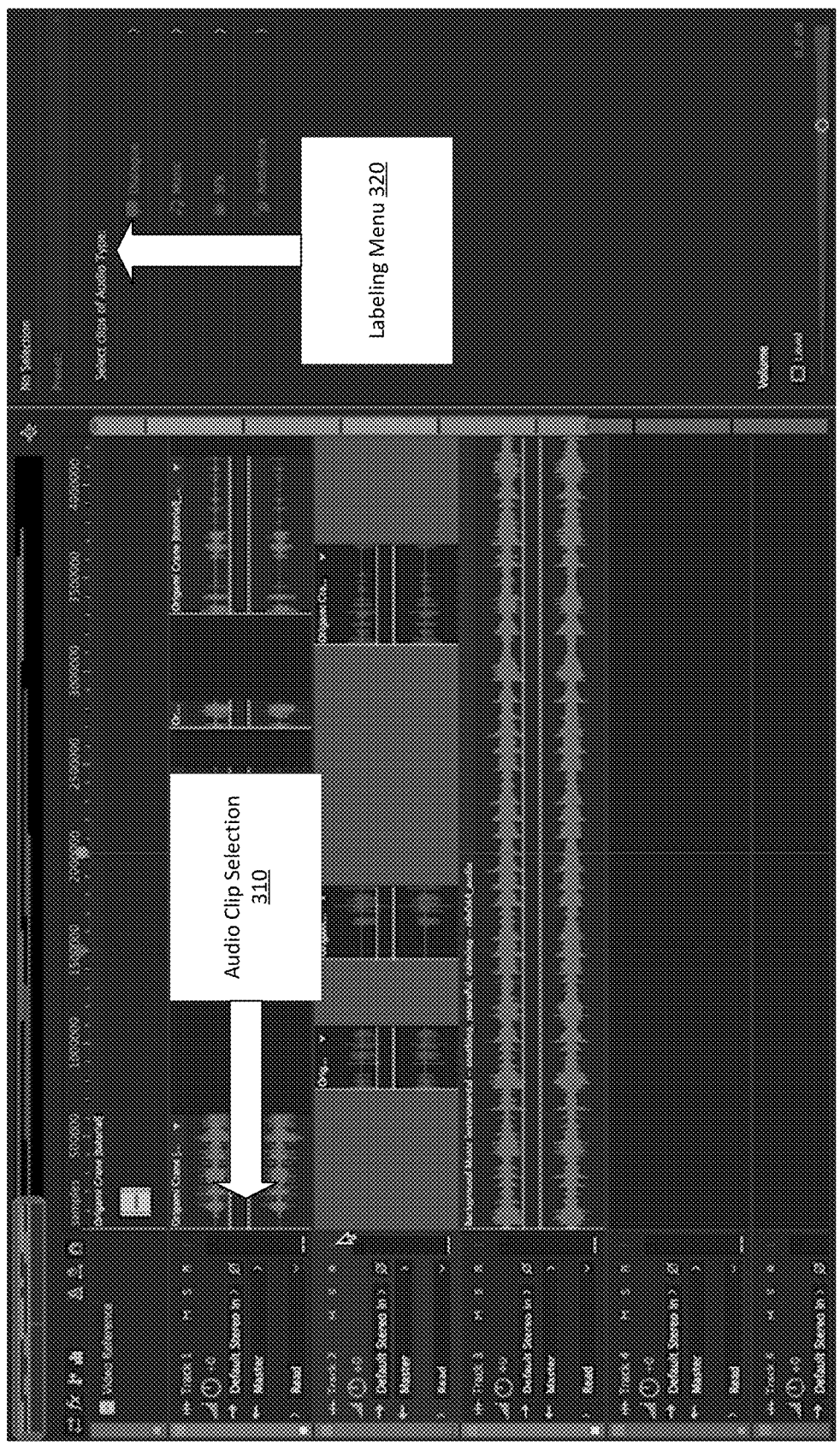
FIG. 3 illustrates an example of a graphical user interface usable to select and label audio clips associated with audio ducking, according to certain embodiments of the present disclosure.

FIG. 3 illustrates an example of a graphical user interface usable to select and label audio clips associated with audio ducking, according to certain embodiments of the present disclosure. The graphical user interface can be presented by the multimedia editing application 110 on the user output device 140 of FIG. 1.

As illustrated, the graphical user interface supports one or more types of user interactions to select an audio clip. For example, a single click, a double-click, a click and drag, a combination of keyboard strikes, selection through a hardware controller, or other user interactions over or in proximity to a presentation of an audio clip on the graphical user interface can be received. The underlying multimedia editing application interprets the received user interaction as a selection 310 of the audio clip. In addition, the multimedia editing application presents a labeling menu 320. This menu 320 allows the user to select an audio type for the selected audio clip, such as a dialogue, music, sound effect, ambiance, and other audio types. In an example, the multimedia editing application sets the selected type as the label of the selected audio clip. In another example, the audio type is pre-associated with a priority (e.g., the multimedia editing application stores a table that lists the association) and sets the priority as the label (e.g., foreground, background). In both examples, the multimedia editing application can store the label in the metadata of the selected audio clip.

Figure 4:
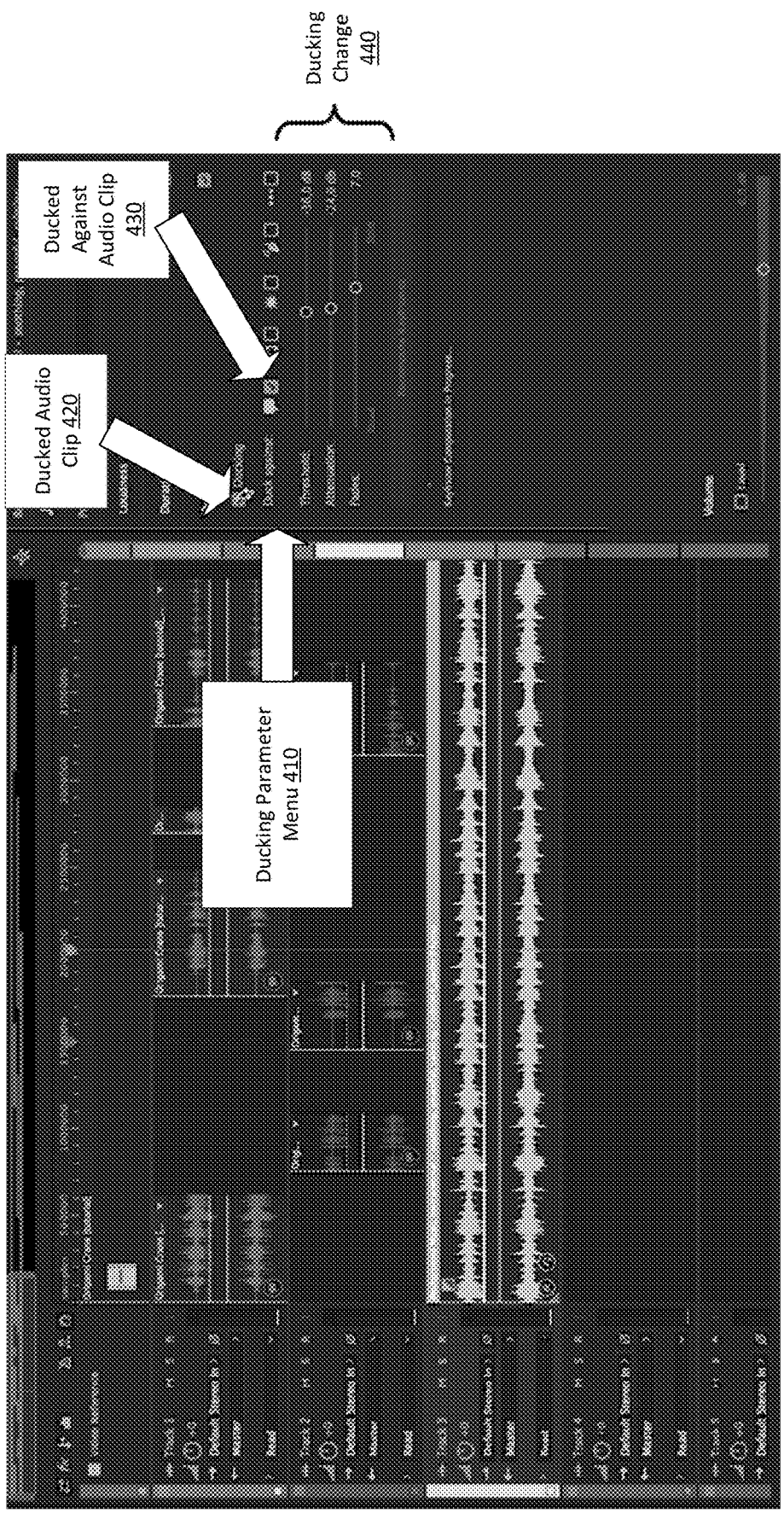
FIG. 4 illustrates an example of a graphical user interface usable to select audio ducking parameters, according to certain embodiments of the present disclosure.

FIG. 4 illustrates an example of a graphical user interface usable to select audio ducking parameters, according to certain embodiments of the present disclosure. The graphical user interface can be presented by the multimedia editing application 110 on the user output device 140 of FIG. 1.

As illustrated, the graphical user interface provides a ducking parameter menu 410 for defining various parameters associated with the audio ducking. In an example, this menu 410 is invoked after a user selects a particular audio clip (as illustrated in connection with FIG. 3). The menu 410 includes different fields. One example is a first selection field 420 to select whether the particular audio clip should be ducked. By receiving a user selection of this first field 420, the underlying multimedia editing application determines that the particular audio clip is to be audio ducked. Another example is a second selection field 430 to select the audio clips to duck against. For example, this second selection field 430 is presented next to each of the audio types. As illustrated, the dialogue type is selected. Accordingly, the multimedia editing application determines that the particular audio clip is to be audio ducked against all dialogue audio clips.

Yet another example is a set of user-tunable parameters, including threshold, attenuation, and fade timing. In the illustration of FIG. 4, audio ducking the particular audio clip includes changing the loudness of this clip according to the parameters. The threshold represents a decibel (dB) value. If the total RMS level of the ducked against audio clips exceeds this dB value, the loudness of the particular audio clip should be reduced (if not already in a ducked state). The attenuation parameter defines this reduction of the loudness. Conversely, when the total RMS level falls below this dB value, the loudness of the particular audio clip should be restored (if not already in an un-ducked state). The fade timing parameter defines distance between the two key frames that represent the transition between "ducked" and "unducked" signal.

In an example, the multimedia application determines look-ahead time, a hold time, and a fade length based on the fade timing. The look-ahead time represents the time length of the observation window (e.g., the number of audio slices when defined in the time domain). The hold time represents the time length before starting to perform the loudness change and the fade length represents the time length between the start and end of the loudness change. Generally, the longer the fade timing, the longer each of the look-ahead time, hold time, and fade length is. The association between the fade timing and each of these three parameters can be predefined and stored in a table accessible to the multimedia editing application.

Figure 5:
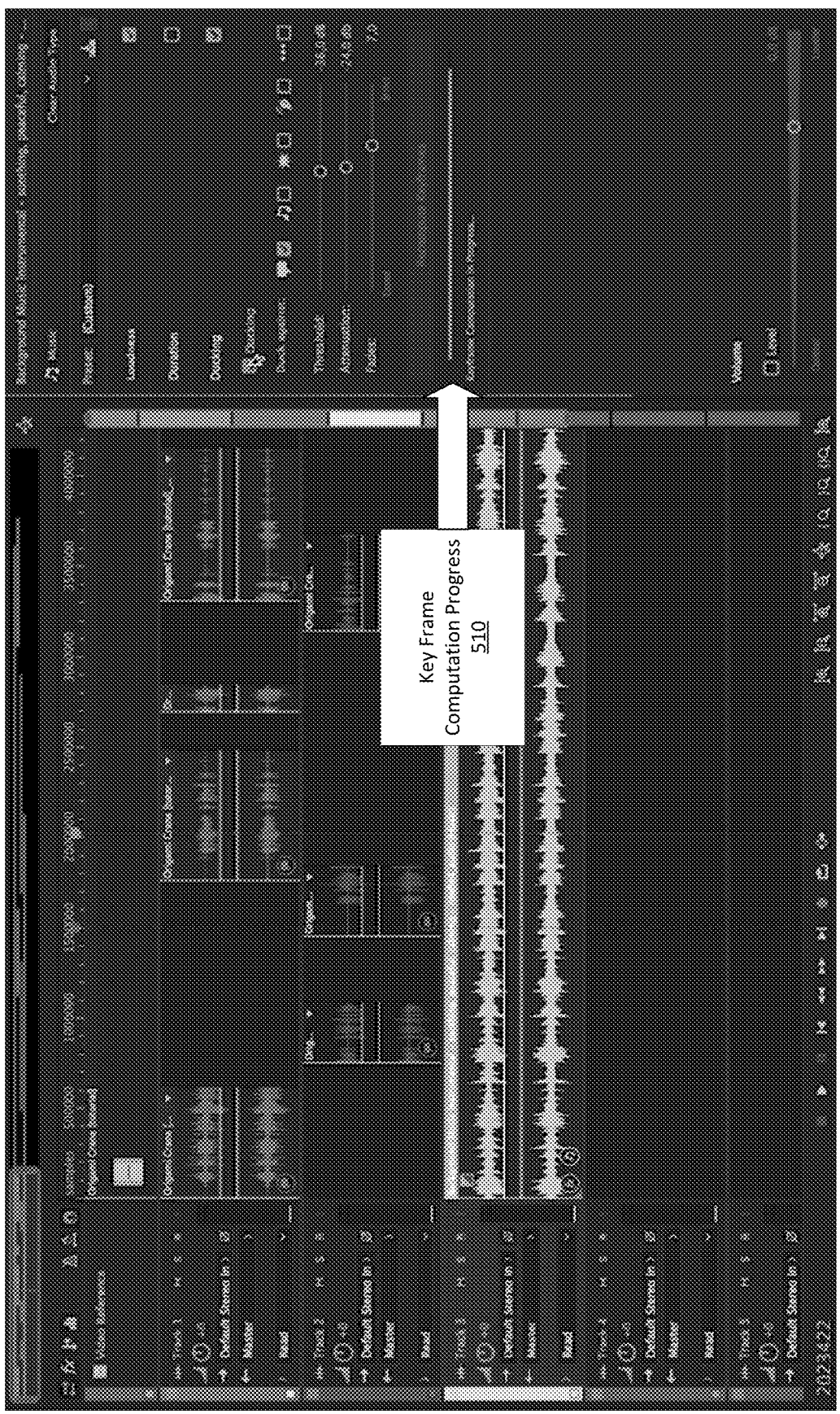
FIG. 5 illustrates an example of a graphical user interface that presents a progress of computing key frames for audio ducking, according to certain embodiments of the present disclosure.

FIG. 5 illustrates an example of a graphical user interface that presents a progress 510 of computing key frames for audio ducking, according to certain embodiments of the present disclosure. The graphical user interface can be presented by the multimedia editing application 110 on the user output device 140 of FIG. 1.

As illustrated, the progress 510 is presented as a bar having a predefined area. The area gets filled as the key frame computation progresses. Importantly, the progress 510 allows the user to determine in real-time the computation status. Generally, the computation is fast and can occur within less than a second after a user defines the audio ducking parameters (e.g., as illustrated in connection with FIG. 4). The computation is even faster and can occur within a few milliseconds after a user moves an audio clip on the track or changes the audio ducking parameters as further illustrated in connection with FIG. 6.

Figure 6:
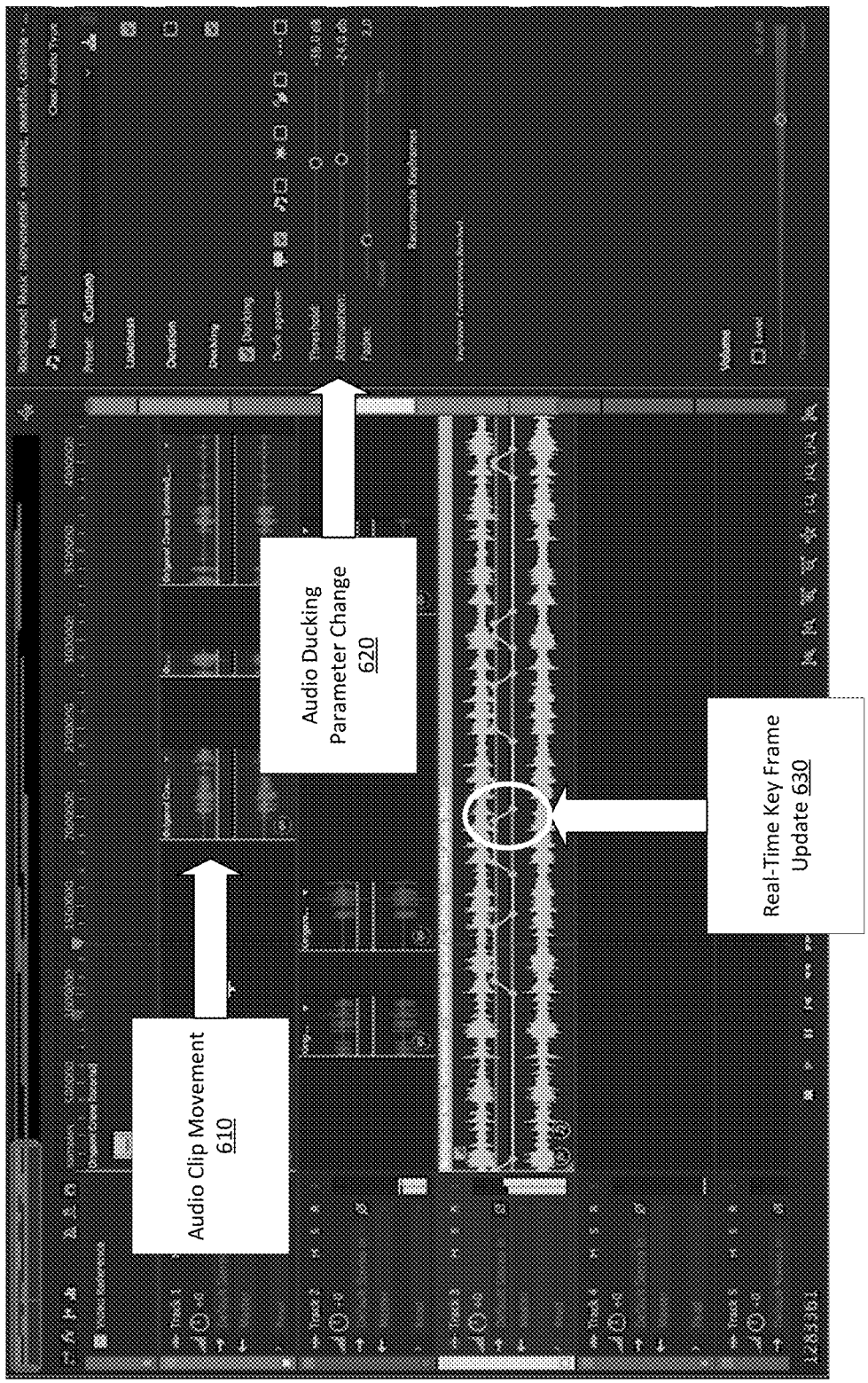
FIG. 6 illustrates an example of a graphical user interface usable to move audio clips and change audio ducking parameters, according to certain embodiments of the present disclosure.

FIG. 6 illustrates an example of a graphical user interface usable to move audio clips and change audio ducking parameters, according to certain embodiments of the present disclosure. The graphical user interface can be presented by the multimedia editing application 110 on the user output device 140 of FIG. 1.

As illustrated, a user interaction is received over or proximate to a presented audio clip on the graphical user interface. The audio clip has a dialogue label (or a label that indicates that it is a ducked against audio clip). The underlying multimedia editing application interprets the user interaction as a movement 610 of the audio clip and updates the graphical user interface to present the movement 610 on the track.

Further, user input can be received in the ducking parameter menu presented on the graphical user interface. This user input changes some or all of the ducking parameters (e.g., the threshold, attenuation, and/or fade timing). The audio clip has a dialogue label (or a label that indicates that it is a ducked against audio clip). The multimedia editing application updates the graphical user interface to present the audio ducking parameter change 610.

In both cases, the multimedia editing application updates the key frames. When summed-area table(s) and leap table(s) are used, the updates can be almost instantaneous (e.g., within a few milliseconds after receiving the user interaction or user input). The multimedia editing application presents the updated key frames 630 by showing them at new locations on the track.

Figure 7:
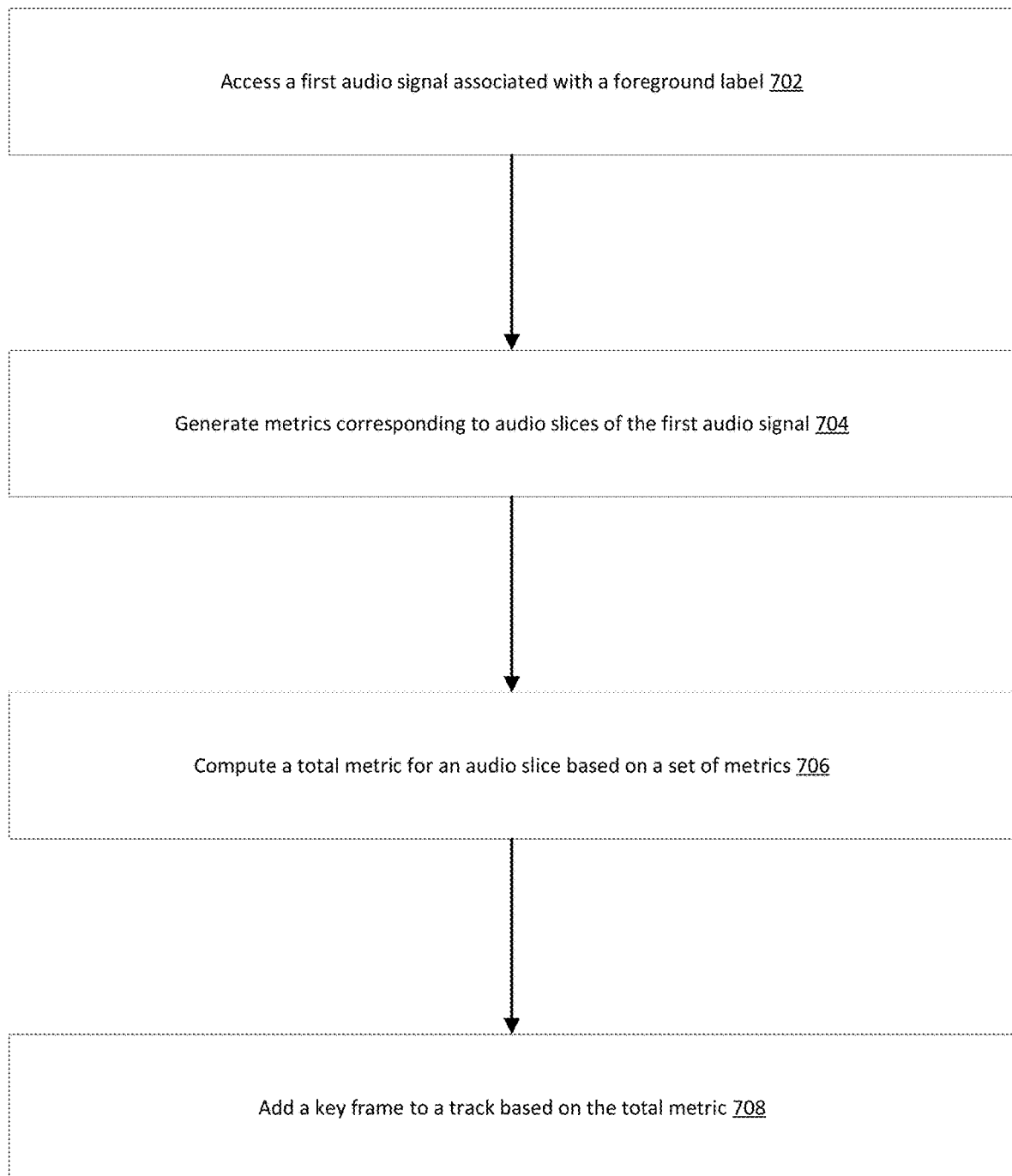
FIG. 7 illustrates an example of a flow for adding key frames for audio ducking, according to certain embodiments of the present disclosure.
Figure 8:
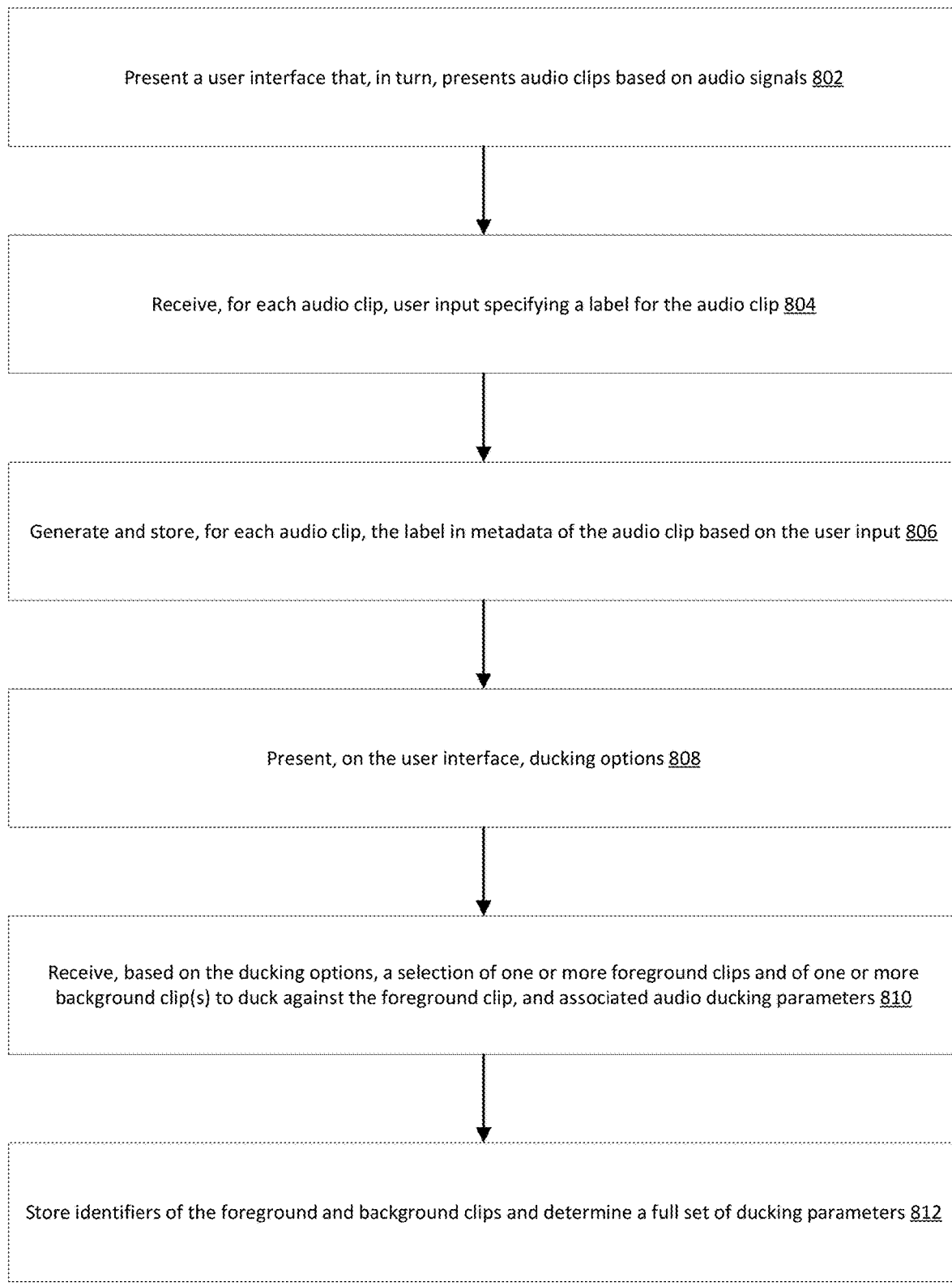
FIG. 8 illustrates an example of a flow for defining parameters associated with audio ducking, according to certain embodiments of the present disclosure.
Figure 10:
FIG. 10 illustrates an example of a flow for updating key frames based on audio clip movement or audio ducking parameter changes, according to certain embodiments of the present disclosure.

Turning to FIGS. 7-10, these figures illustrate examples of flows associated with audio ducking, according to certain embodiments of the present disclosure. FIG. 7 illustrates an example of a flow for adding key frames for the audio ducking. Some or all of the operations for the example flow of FIG. 7 include multiple steps. These steps are further described in connection with FIGS. 8-10. In particular, FIG. 8 illustrates an example of a flow for defining parameters associated with the audio ducking. FIG. 9 illustrates an example of a flow for processing audio signals based on the audio ducking parameters. And FIG. 10 illustrates an example of a flow for updating the key frames based on audio clip movement or audio ducking parameter changes.

In the interest of clarity of explanation, the example flows are described in connection with adding a key frame. However, these flows are similarly applicable to adding multiple key frames. Generally, a key frame is added to indicate a change to an audio property of an audio signal that should be ducked. The change depends on the current ducked state of this audio signal. For example, the key frame indicates a reduction of the loudness of a background audio signal when this audio signal is in an un-ducked state and to restoring the loudness of the background audio signal to its un-ducked state when the background audio signal is in a ducking state. Also in the interest of clarity of explanation, some of the operations of the flow are described in connection with ducking one audio signal against another audio signal. However, the operations are similarly applicable to ducking one or more audio signals against one or more other audio signals.

A computer system hosting a multimedia editing application, such as the computing device 100 hosting the multimedia editing application 110 of FIG. 1, may be configured to perform the illustrative flows in some embodiments. Instructions for performing the operations of the illustrative flows can be stored as computer-readable instructions on a non-transitory computer-readable medium of the computer system. As stored, the instructions represent programmable modules that include code or data executable by a processor(s) of the computer system. The execution of such instructions configures the computer system to perform the specific operations shown in the figures and described herein. Each programmable module in combination with the processor represents a means for performing a respective operation(s). While the operations are illustrated in a particular order, it should be understood that no particular order is necessary and that one or more operations may be omitted, skipped, and/or reordered.

FIG. 7 illustrates an example of a flow for adding key frames for audio ducking, according to certain embodiments of the present disclosure. The example flow starts at operation 702, where the computer system accesses a first audio signal associated with a foreground label. This audio signal may be referred to as a foreground audio signal. In an example, the foreground audio signal is accessed from one or more audio sources, such as an audio file, a microphone, and/or a line into the computer system. In the illustrative examples of FIGS. 2-6, the foreground audio signal is a dialogue.

At operations 704, the computer system generates metrics corresponding to audio slices of the first audio signal. For example, the computer system generates the audio slices from the foreground audio signal in the time domain or in the frequency domain. The audio slices are sequential and non-overlapping. The metrics are audio signal metrics and are generated by analyzing an audio property of the audio signal within each audio slice. In the illustrative examples of FIGS. 2-6, the audio slices are time slices, each ten milliseconds long. Each metric corresponds to one of the audio slices and is the average RMS level of the audio signal in that audio slice. Further, the computer system can organize information about the audio slices in a summed-area table and a leap table generated specifically for the foreground audio signal based on the metrics, as described in connection with FIG. 1.

At operations 706, the computer system computes a total metric for an audio slice based on a set of metrics. For example, the set of metrics represents an observation window that starts with the audio slices and that ends with another audio slice. If the leap table indicates that a key frame analysis is needed at the location of the audio slice, the total metric is derived from the summed-area table by looking up two entries in that table: the first entry corresponds to the audio slice (e.g., the start of the observation window) and the second entry corresponds to the other audio slice (e.g., the end of the observation window). In the illustrative examples of FIGS. 2-6, the observation window is a time window that is fifty milliseconds longs and, thus, contains five audio slices. It starts at time "$t_n$" and ends at time "$t_n$+50 ms," where "$t_n$" corresponds to the start time of the audio slice. The total metric is an average RMS level across these five slices, where the average RMS level is derived from the summed-area table.

At this operation also, if there are more than one foreground audio signals to be ducked against, the total metric is similarly generated for each of such signals. The total metric is generated by using an observation window that starts and ends at the same locations as the one above (e.g., in the illustrative examples of FIGS. 2-6, the observation window for each analyzed foreground audio signal starts at time "$t_n$" and ends at time "$t_n$+50 ms"). These observation windows can be referred to as parallel observation windows (e.g., windows having the same start and end in the time domain or frequency domain). The computer system generates a total (or final) metric by combining the total metrics for the parallel observation window across the to be ducked against audio signals.

At this operation also, if distance is to be used in the key generation decision as further described in connection with FIG. 9, a total metric is also similarly computed for the background audio signal that should be ducked, by computing metrics, generating a summed-area table, and using a parallel observation window as above.

At operations 708, the computer system adds a key frame to a track based on the total metric. In the case of multiple audio signals to be ducked against, this total metric is the final metric. In an example, thresholding is used. In particular, the computer system compares the total metric to a threshold. Based on the comparison (e.g., if the total metric is greater than the threshold), the computer system determines that audio ducking is possible. The computer system then considers the current state of the background audio signal. If already ducked, the computer system determines that there should not be any change and does not add the key frame. Otherwise, the computer system determines that the key frame is needed and adds the key frame to a particular location. Conversely, based on the comparison (e.g., if the total metric is smaller than the threshold) and the current state (e.g., if already in the ducked state), the computer system determines that audio ducking is no longer be needed. Accordingly, the computer system also adds the key frame at the particular location to transition the background audio signal from its current ducked state to the un-ducked state. The particular location is within the observation window, such as its start (e.g., at time "$t_n$"), its end (e.g., at time "$t_n$+50 ms"), or any in-between location. In an example, the location is the end of the audio slice (e.g., at time "$t_n$+10 ms").

FIG. 8 illustrates an example of a flow for defining parameters associated with audio ducking, according to certain embodiments of the present disclosure. The example flow starts at operation 802, where the computer system presents a user interface. In turn the user interface presents audio clips based on audio signals. In an example, the presentation can include multiple modalities, such as graphical and audible modalities. In the illustrative examples of FIGS. 2-6, the user interface includes a graphical user interface to support the graphical modality.

At operation 804, the computer system receives, for each audio clip, user input specifying a label for the audio clip. In an example, the label specifies an audio type, such as dialogue, music, speech, etc. That audio type can be automatically (e.g., based on an association table available to the computer system) or manually (e.g., based on user input) associated with a priority (e.g., foreground or background). In another example, the label specifies the priority. In both examples, the label information is received on the user interface based on user interaction with the user interface.

At operation 806, the computer system generates and stores, for each audio clip, the label in metadata of the audio clip based on the user input. For example, the computer system adds the audio type and/or priority to the metadata of the audio clip.

At operation 808, the computer system presents on the user interface ducking options. For example, these options are presented as part of a menu on the user interface. The menu allows the user to select various audio ducking parameters including, for instance, the selection of one or more audio clips to be ducked (e.g., background audio clip(s)), the selection of one or more audio clips to be ducked against (e.g., foreground audio clip(s)), and settings for transitions between an un-ducked state and a ducked state (e.g., threshold, attenuation, fade timing). The settings to and from the ducked state need not be symmetric.

At operation 810, the computer system receives, based on the ducking options, a selection of one or more foreground clips and of one or more background clips to duck against the foreground clip(s), and the associated audio ducking parameters (e.g., the settings). For example, this information is received on the user interface based on user interaction with the user interface.

At operation 812, the computer system stores identifiers of the foreground and background clips and determines a full set of ducking parameters. For example, the foreground clip(s) that should be ducked against and the background audio clips(s) that should be ducked are identified in a list. Further, look-ahead time, hold time, and fade length are derived from the fade timing based on an association table available to the computer system.

Although the example flow of FIG. 8 illustrates a manual labeling and selection of audio ducking parameters, such operations can be automated. For example, the computer system may host audio recognition software that can detect the audio type and accordingly label each audio clip. Further, the computer system can store default settings for selecting the foreground and background audio clips based on their audio types (e.g., dialogue is defaulted to foreground and speech, music, or sound effects is defaulted to background) and for applying specific audio ducking parameters (e.g., a default attenuation, a default fade timing, and a default threshold).

FIG. 9 illustrates an example of a flow for processing audio signals based on audio ducking parameters, according to certain embodiments of the present disclosure. In the interest of clarity of explanation, the example flow is described in connection with using RMS levels as metrics. However, other types of metrics are possible to use under a time domain and/or frequency domain analysis. The metrics generally indicate how a property of an audio signal changes over time or frequency.

The example flow starts at operation 902, where the computer system generates, for each selected foreground audio clip, audio slices each having a predetermined time length. For example, each audio slice is 10 ms long. The audio slices are sequential and non-overlapping. The computer system identifies each audio slice based on its location in time or position in the sequence.

At operation 904, the computer system computes, for each of the audio slices, a root mean square (RMS) level. At operation 906, the computer system generates, for each selected foreground audio clip, a summed-area table based on the RMS levels of the audio slices of the selected foreground audio clip. For example, an audio slice "n" in the sequence of audio slices has a corresponding entry "I(n)" in the summed-area table, where $I(n)=\Sigma_{n'\leq n}$ individualRMS(n').

At operation 908, the computer system generates, for each selected foreground audio clip, a leap table based on changes to the RMS levels of the audio slices of the selected foreground audio clip. In an example, the possible RMS levels are quantized in large virtual buckets of a certain level (e.g., 4.5 dB). The leap table is a list that contains an entry for every time the RMS level of an audio slice changes from a current quantization bucket into another quantization bucket.

At operation 910, the computer system skips, for each selected foreground audio clip, the computation of an average RMS level for a time period based on entries of the corresponding leap table. In an example, the leap table is used to identify the starts of the look-ahead time windows for which the average RMS levels should be computed. In particular, two consecutive entries in the leap table correspond to two non-consecutive audio slices. The individual RMS levels of the audio slices in between these two non-consecutive audio slices do not significantly change. Thus, the analysis of the observation window starting at any of these in-between audio slices is not needed. Accordingly, the computer system skips generating an observation window for the in-between audio slices. Instead, the computer system jumps directly from computing the average RMS level of an observation window starting at the first non-consecutive audio slice to computing the average RMS level of an observation window starting at the second non-consecutive audio slice.

At operation 912, the computer system computes an average RMS level for an observation window based on entries in the corresponding summed-area table. In an example, the RMS level is computed for each selected foreground audio clip and for each observation window identified for this audio clip at operation 910. The computation for a selected foreground audio clip uses its summed-area table. For example, an observation window starts at audio slice "n" and ends at audio slice "n+5." The average RMS level is computed from the entries "I" of the summed-area table as AverageRMS(n, n+5)=(I(n+5)−I(n))/5. If multiple average RMS levels are computed for parallel observation windows across the selected foreground audio signals, these average RMS levels are combined to generate an average RMS level (or total RMS level). This total RMS level is used at the next operations of the example flow and is referred to as average RMS level.

At operation 914, the computer system determines that a key frame should be added based on a comparison of the average RMS level to a threshold or based on a distance to one or more selected background audio signals. The thresholding approach is explained herein next, followed by the distance approach. Nonetheless, in both approaches, the determination can follow a state machine that also considers the current ducking state.

Under the thresholding technique, if the RMS level exceeds the threshold, and if no audio ducking is occurring, the computer system generates a decision to add the key frame at operation 916. This key frame applies the audio ducking. If the RMS level exceeds the threshold, and if the audio ducking is already occurring, no change to the ducking state is needed. Accordingly, the computer system generates a decision not to add the key frame at operation 916. Conversely, if the RMS level is below the threshold, and if no audio ducking is occurring, no change to the ducking state is needed. Accordingly, the computer system generates a decision not to add the key frame at operation 916. If the RMS level is below the threshold, and if audio ducking is already occurring, the computer system determines that a transition out of the audio ducking is needed. Accordingly, the computer system generates a decision to add the key frame at operation 916. This key frame removes the audio ducking.

Under the distance technique, the computer system also computes the average RMS level for the one or more selected background audio signals in a similar fashion (e.g., based on individual RMS levels of 10 ms audio slices first, and then based on entries of summed-area table(s) generated from the individual RMS levels). The computer system compares the average RMS level of the selected foreground audio signal(s) to the average RMS level of the selected background audio signal(s) across parallel observation windows. The difference between the two levels is the distance.

If the distance is outside a range (e.g., 4.5 dB), and if no audio ducking is occurring, the computer system generates a decision to add the key frame at operation 916. This key frame applies the audio ducking. If the distance is outside the range, and if the audio ducking is already occurring, no change to the ducking state is needed. Accordingly, the computer system generates a decision not to add the key frame at operation 916. Conversely, if the distance is within the range, and if no audio ducking is occurring, no change to the ducking state is needed. Accordingly, the computer system generates a decision not to add the key frame at operation 916. If the distance is within the range, and if audio ducking is already occurring, the computer system determines that a transition out of the audio ducking is needed. Accordingly, the computer system generates a decision to add the key frame at operation 916. This key frame removes the audio ducking.

The thresholding approach has the technical advantage over the distance approach of being computationally more efficient, because no individual RMS levels or average RMS level need to be computed for the background audio clip(s). In turn, this computationally efficiency is translated in a faster generation of key frames, as applicable.

At operation 918, the computer system generates, if the decision is to add, the key frame based on audio ducking parameters. For example, the computer system places the key frame at a particular location on the track. The key frame references whether the one or more selected background audio signals should be transitioned from an un-ducked state to a ducked state or vice versa as determined at operation 916. Further, the key frame references the relevant audio ducking settings, such as the gain reduction, hold time, and fade length to be applied to the one or more selected background audio signals.

FIG. 10 illustrates an example of a flow for updating key frames based on audio clip movement or audio ducking parameter changes, according to certain embodiments of the present disclosure. The example flow of FIG. 10 starts at operation 1002, where the computer system receives, on a user interface, user input specifying a movement of a foreground audio clip. For example, a user interacts with the user interface to change the location of the foreground audio clip on a track. The location can be in time if a time domain presentation is provided on the user interface, or can be in frequency if a frequency domain presentation is provided instead.

At operation 1004, the computer system updates the track based on the movement of the foreground audio clip. For example, the track is re-organized such that the foreground audio clip is moved from its current location to a new location according to parameters of the movement.

At operation 1006, the computer system computes an average RMS level based on entries of summed-area tables that remain unchanged based on the movement of the foreground audio clip. At this operation, multiple foreground audio signals are to be ducked against. The average RMS level is the combination of average RMS levels of parallel observation windows across these foreground audio signals. The computer system need not update any of the summed-area tables. Their entries that were generated prior to updating the track are still applicable. Accordingly, the average RMS level is computed from these unchanged entries, similarly to what was described in connection with operation 912 of FIG. 9.

At operation 1008, the computer system updates a key frame based on the average RMS level. In an example, based on the average RMS level, the update removes an existing key frame having a location within the parallel observation windows (e.g., one added prior to the track update) and adds a new key frame to another location within the parallel observation windows.

At operation 1010, the computer system receives, on the user interface, user input specifying a gain of the foreground audio signal. For example, the user input changes the loudness of this audio signal.

At operation 1012, the computer system updates the entries of the corresponding summed-area table (e.g., the one of the foreground audio signal) based on the gain without recomputing RMS values of audio slices. For example, the entries of this table are scaled up or down depending on the gain.

At operation 1014, the computer system updates a key frame based on the updated entries of the summed-area table. In an example, based on an average RMS level, the update removes an existing key frame having a location within the parallel observation windows (e.g., one added prior to the gain update) and adds a new key frame to another location within the parallel observation windows. Here, the average RMS level is determined from the updated entries of the summed-area table and from the entries of the remaining summed-area table(s).

Figure 11:
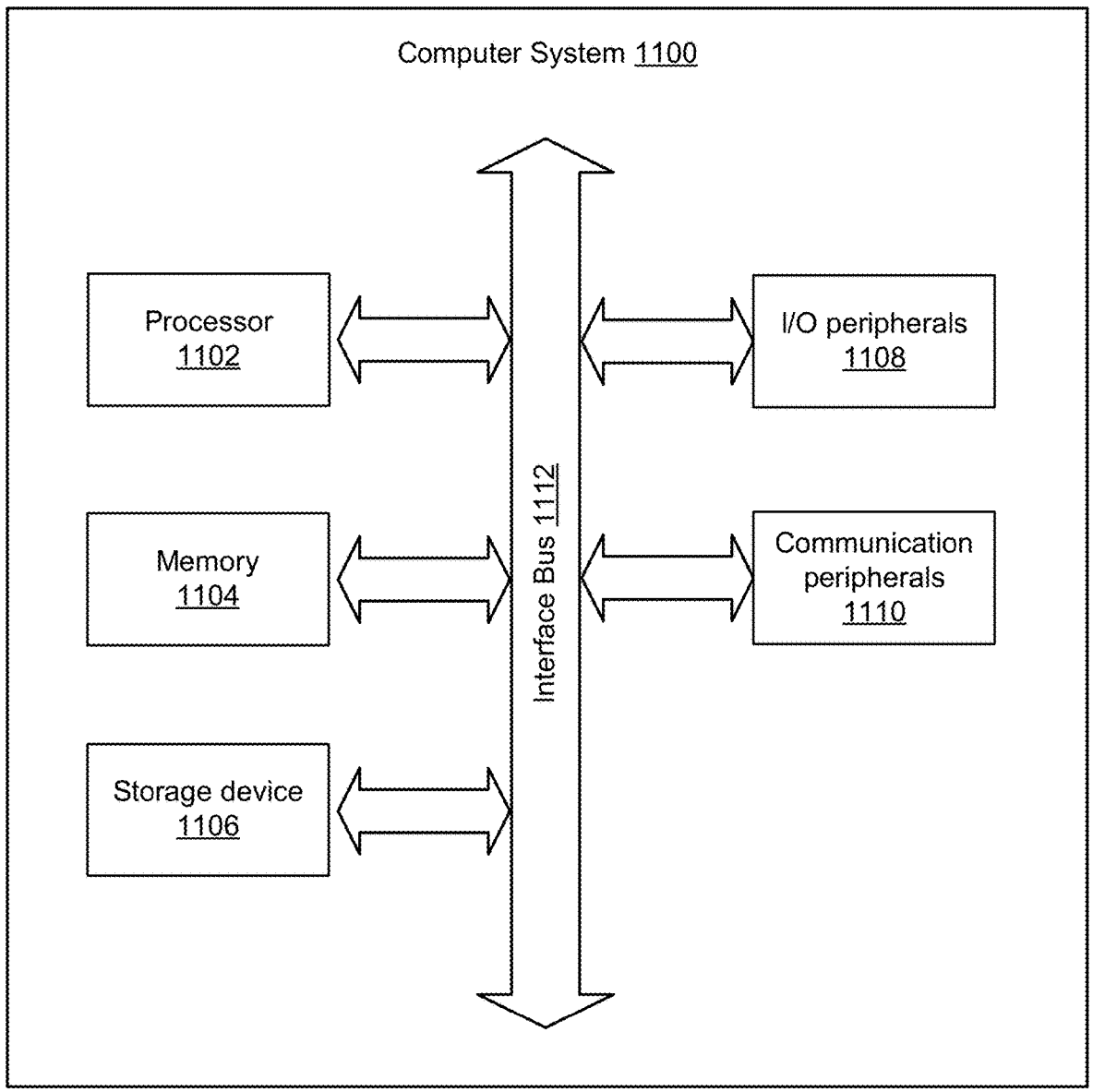
FIG. 11 illustrates examples of components of a computer system, according to certain embodiments of the present disclosure.

FIG. 11 illustrates examples of components of a computer system 1100, according to certain embodiments of the present disclosure. The computer system 1100 includes at least a processor 1102, a memory 1104, a storage device 1106, input/output peripherals (I/O) 1108, communication peripherals 1110, and an interface bus 1112. The interface bus 1112 is configured to communicate, transmit, and transfer data, controls, and commands among the various components of the computer system 1100. The memory 1104 and the storage device 1106 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer-readable storage media can be configured to store instructions or program codes embodying aspects of the disclosure. The memory 1104 and the storage device 1106 also include computer-readable signal media. A computer-readable signal medium includes a propagated data signal with computer-readable program code embodied therein. Such a propagated signal takes any of a variety of forms including, but not limited to, electromagnetic, optical, or any combination thereof. A computer-readable signal medium includes any computer-readable medium that is not a computer-readable storage medium and that can communicate, propagate, or transport a program for use in connection with the computer system 1100.

Further, the memory 1104 includes an operating system, programs, and applications. The processor 1102 is configured to execute the stored instructions and includes, for example, a logical processing unit, a microprocessor, a digital signal processor, and other processors. The memory 1104 and/or the processor 1102 can be virtualized and can be hosted within another computing system of, for example, a cloud network or a data center. The I/O peripherals 1108 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 1108 are connected to the processor 1102 through any of the ports coupled to the interface bus 1112. The communication peripherals 1110 are configured to facilitate communication between the computer system 1100 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computer system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method for audio signal processing, the method comprising:
analyzing a foreground audio signal to determine metrics corresponding to audio slices of the foreground audio signal, wherein each metric corresponds to a respective audio slice and indicates a value for an audio property of the respective audio slice;
computing entries of a summed-area table based on the metrics of multiple audio slices in an observation window around an audio slice;
determining a total metric for the audio slice from (i) a first entry of the summed-area table corresponding to a first audio slice of the observation window and (ii) a second entry of the summed-area table corresponding to a second audio slice of the observation window; and
adding a key frame to a track based on the total metric, wherein the track comprises the foreground audio signal and a background audio signal, wherein a location of the key frame corresponds to a location of the audio slice on the track, and wherein the key frame indicates a change to the audio property of the background audio signal at the location on the track,
wherein the key frame added to the track based on the total metric is utilizable for audio ducking, the audio ducking comprising adapting a property of the background audio signal based on a state of the foreground audio signal.

2. The computer-implemented method of claim 1, wherein the foreground audio signal has a time length, wherein each of the audio slices has a first predefined time length smaller than the time length of the foreground audio signal, and wherein the multiple audio slices in the observation window have a second predefined time length larger than the first predefined time length and smaller than the time length of the foreground audio signal.

3. The computer-implemented method of claim 2, wherein the first predefined time length of each audio slice is in a range of two milliseconds to twenty milliseconds, and wherein the second predefined time length is in a range of thirty milliseconds to two hundred milliseconds.

4. The computer-implemented method of claim 1, wherein the metrics are root mean squares (RMS) levels, and wherein the total metric is an average RMS level computed based on the summed-area table.

5. The computer-implemented method of claim 4, wherein the multiple audio slices in the observation window are organized in a sequence that starts with the audio slice for which the total metric is computed and that ends with another audio slice, and wherein the average RMS level is computed from the first entry of the summed-area table corresponding to the audio slice and from the second entry of the summed-area table corresponding to the other audio slice.

6. The computer-implemented method of claim 4, further comprising:
generating, a leap table based on changes to the metrics of the audio slices, wherein an entry of the leap table indicates that a change to the audio property between two audio slices of the foreground audio signal is within a predefined range.

7. The computer-implemented method of claim 6, further comprising:
determining that a particular key frame between locations of the two audio slices on the track is unneeded based on the entry of the leap table; and
deciding not to add the particular key frame between the locations of the two audio slices on the track, based on determining that the particular key frame is unneeded.

8. The computer-implemented method of claim 1, wherein the key frame is added to the track based on a comparison of the total metric to a threshold, and wherein the threshold is defined based on parameters associated with ducking the background audio signal against the foreground audio signal.

9. The computer-implemented method of claim 1, wherein the key frame is added to the track based on a distance between the foreground audio signal and the background audio signal, wherein the distance is computed based on the total metric generated for the audio slice of the foreground audio signal and based on a second total metric generated for a second audio slice of the background audio signal, and wherein the audio slice and the second audio slice have the same location on the track.

10. The computer-implemented method of claim 1, further comprising:
presenting the track on a user interface; and
receiving user input specifying a foreground label of the foreground audio signal, a background label of the background audio signal, a ducking of the background audio signal against the foreground audio signal, and parameters associated with the ducking, and wherein the change to the audio property of the foreground audio signal is based on the parameters associated with the ducking.

11. The computer-implemented method of claim 1, wherein the entries of the summed-area table are a function of the metrics of the audio slices, and the method further comprising:
receiving user input specifying a movement of the foreground audio signal on the track;
updating the track based on the movement of the foreground audio signal;
computing a second total metric for the audio slice based on the summed-area table, wherein the summed-area table remains unchanged based on the movement of the foreground audio signal; and
adding a second key frame to the track based on the second total metric.

12. The computer-implemented method of claim 1, wherein the entries of the summed-area table are a function of the metrics of the audio slices, and the method further comprising:
receiving user input specifying a gain of the foreground audio signal;
updating the entries of the summed-area table based on the gain without re-generating the metrics; and
adding a second key frame to the track based on the updated entries of the summed-area table.

13. A non-transitory computer-readable storage medium comprising instructions that, upon execution on a computer system, cause the computer system to perform operations comprising:
analyzing a foreground audio signal to determine metrics corresponding to audio slices of the foreground audio signal, wherein each metric corresponds to a respective audio slice and indicates a value for an audio property of the respective audio slice;
computing entries of a summed-area table based on the metrics of multiple audio slices in an observation window around an audio slice;
determining a total metric for the audio slice from (i) a first entry of the summed-area table corresponding to a first audio slice of the observation window and (ii) a second entry of the summed-area table corresponding to a second audio slice of the observation window; and
adding a key frame to a track based on the total metric, wherein the track comprises the foreground audio signal and a background audio signal, wherein a location of the key frame corresponds to a location of the audio slice on the track, and wherein the key frame indicates a change to the audio property of the background audio signal at the location on the track,
wherein the key frame added to the track based on the total metric is utilizable for audio ducking, the audio ducking comprising adapting a property of the background audio signal based on a state of the foreground audio signal.

14. The non-transitory computer-readable storage medium of claim 13, wherein adding the key frame to the track comprises:
determining that the background audio signal is un-ducked and that the total metric indicates that the background audio signal should be ducked; and
setting the key frame based on parameters associated with ducking the background audio signal.

15. The non-transitory computer-readable storage medium of claim 13, wherein adding the key frame to the track comprises:
determining that the background audio signal is ducked and that the total metric indicates that the background audio signal should be un-ducked; and
setting the key frame based on parameters associated with un-ducking the background audio signal.

16. A computer system comprising:
means for analyzing a foreground audio signal to determine metrics corresponding to audio slices of the foreground audio signal, wherein each metric corresponds to a respective audio slice and indicates a value for an audio property of the respective audio slice;
means for computing entries of a summed-area table based on the metrics of multiple audio slices in an observation window around an audio slice;
means for determining a total metric for the audio slice from (i) a first entry of the summed-area table corresponding to a first audio slice of the observation window and (ii) a second entry of the summed-area table corresponding to a second audio slice of the observation window; and
means for adding a key frame to a track based on the total metric, wherein the track comprises the foreground audio signal and a background audio signal, wherein a location of the key frame corresponds to a location of the audio slice on the track, and wherein the key frame indicates a change to the audio property of the background audio signal at the location on the track,
wherein the key frame added to the track based on the total metric is utilizable for audio ducking, the audio ducking comprising adapting a property of the background audio signal based on a state of the foreground audio signal.

17. The computer system of claim 16, further comprising:
means for presenting a user interface associated with ducking the background audio signal, means for receiving, based on the user interface, user input labeling the foreground audio signal as foreground, specifying the ducking of the background audio signal against the foreground audio signal, and identifying parameters associated with the ducking, wherein the change to the audio property of the background audio signal is based on the parameters associated with the ducking.

18. The computer system of claim 17, wherein the user input specifies a threshold, a gain reduction, and a fade timing as the parameters, and the computer system further comprising:

means for determining a look-ahead time, a hold time, and a fade length based on the fade timing, wherein the key frame is added to the track based on the threshold, the gain reduction, the look-ahead time, the hold time, and the fade length.

19. The method of claim 1, wherein computing the entries of the summed-area table comprises computing the first entry of the summed-area table based on a sum of respective metrics of audio slices preceding the first audio slice in the foreground audio signal.

20. The method of claim 1, further comprising:
detecting a change to the foreground audio signal;
recomputing the entries of the summed-area table based on the change to the foreground audio signal; and
updating the key frame based on the recomputed entries of the summed-area table.

* * * * *